United States Patent
Heo et al.

(10) Patent No.: US 8,072,920 B2
(45) Date of Patent: Dec. 6, 2011

(54) METHOD FOR SIGNALING RESOURCE ASSIGNMENT INFORMATION IN A FREQUENCY DIVISION MULTIPLE ACCESS SYSTEM

(75) Inventors: Youn-Hyoung Heo, Suwon-si (KR); Ju-Ho Lee, Suwon-si (KR); Hwan-Joon Kwon, Hwaseoung-si (KR)

(73) Assignee: Samsung Electronics Co., Ltd (KR)

( * ) Notice: Subject to any disclaimer, the term of this patent is extended or adjusted under 35 U.S.C. 154(b) by 747 days.

(21) Appl. No.: 11/789,029

(22) Filed: Apr. 23, 2007

(65) Prior Publication Data
US 2007/0259672 A1    Nov. 8, 2007

(30) Foreign Application Priority Data
Apr. 21, 2006    (KR) .................. 10-2006-0036438

(51) Int. Cl.
*H04B 7/212*    (2006.01)
(52) U.S. Cl. ......... 370/322; 370/342; 370/345; 370/347
(58) Field of Classification Search .................. 370/320, 370/335, 342, 209, 337, 347, 322, 345
See application file for complete search history.

(56) References Cited

U.S. PATENT DOCUMENTS

| | | | |
|---|---|---|---|
| 2003/0133426 A1* | 7/2003 | Schein et al. | 370/337 |
| 2005/0007974 A1* | 1/2005 | Vasudevan et al. | 370/320 |
| 2007/0165731 A1* | 7/2007 | Xiao et al. | 375/260 |
| 2007/0211620 A1* | 9/2007 | McBeath et al. | 370/209 |
| 2007/0230412 A1* | 10/2007 | McBeath et al. | 370/338 |

* cited by examiner

*Primary Examiner* — Barry Taylor
(74) *Attorney, Agent, or Firm* — The Farrell Law Firm, P.C.

(57) ABSTRACT

A method for efficiently signaling resource assignment information to notify User Equipment (UE) of allocated resources in an Frequency Division Multiple Access mobile communication system is provided, in which a base station signals UE Identifications in the order of allocated resource blocks to UEs without explicitly notifying the positions of the allocated resource blocks, so that the UEs can find out resource blocks about which resource assignment information is not required, thereby reducing signaling overhead.

31 Claims, 7 Drawing Sheets

DISTRIBUTED RESOURCE ALLOCATION

METHOD FOR SIGNALING RESOURCE ASSIGNMENT INFORMATION IN A FREQUENCY DIVISION MULTIPLE ACCESS SYSTEM

PRIORITY

This application claims priority under 35 U.S.C. §119(a) to a Korean Patent Application filed in the Korean Intellectual Property Office on Apr. 21, 2006 and assigned Serial No. 2006-36438, the disclosure of which is incorporated herein by reference.

BACKGROUND OF THE INVENTION

1. Field of the Invention

The present invention generally relates to a mobile communication system. More particularly, the present invention relates to a method for efficiently signaling resource assignment information in a Frequency Division Multiple Access (FDMA) system.

2. Description of the Related Art

Owing to the rapid development of communications technology, mobile communication systems have reached a developmental stage that provides a high-speed data service for sending a large amount of digital data such as e-mails, still images, and moving pictures at high rate to User Equipment (UE) or Mobile Stations (MSs), beyond the traditional voice service.

In this context, Orthogonal Frequency Division Multiplexing (OFDM) has recently been studied and is being actively exploited for the mobile communication systems. OFDM is a special case of Multi-Carrier Modulation (MCM) in which an input serial symbol sequence is parallelized and modulated to mutually orthogonal subcarriers or subcarrier channels, prior to transmission.

FIG. 1 provides an example of time-frequency resource allocation in an OFDM mobile communication system to which the present invention is applied. Referring to FIG. 1, one modulation symbol (e.g. Quadrature Phase Shift Keying (QPSK) or 16-ary Quadrature Amplitude Modulation (16QAM) symbol) is sent, generally on a single subcarrier. The subcarrier is a resource unit in the high-speed data service.

In FIG. 1, the horizontal axis represents time and the vertical axis represents frequency. Reference numeral 101 denotes a subcarrier and reference numeral 102 denotes an OFDM symbol. As illustrated in FIG. 1, one OFDM symbol is composed of a plurality of subcarriers.

The OFDM system sends a plurality of OFDM symbols as a transmission unit called Transmission Time Interval (TTI), as denoted by reference numeral 103. In FIG. 1, a single rectangle defines a time-frequency bin and one TTI has a plurality of time-frequency bins.

Typically, one TTI includes a plurality of physical channels. The physical channels are channels that carry different types of information in the mobile communication system, including paging, packet data, packet data control and uplink scheduling channels.

For example, part of a TTI, that is, some of time-frequency bins, are used for a paging channel, a common control channel carrying system information, a packet data channel carrying user data and a packet data control channel carrying control information required for demodulation of the packet data channel, as illustrated in FIG. 1. While not specified herein, other physical channels may exist to serve other purposes and thus part of the time-frequency bins may be occupied by these other physical channels.

As described above, the OFDM mobile communication system uses two-dimensional resources, i.e. time-frequency resources which are divided into smaller areas for allocation to a plurality of UEs. Because the UEs require different amounts of resources, resources (time-frequency bins) allocated to them should be efficiently agreed on or determined between a transmitter and receivers.

For instance, given 5000 time-frequency bins in one TTI, if the transmitter allocates time-frequency bins 1 to 100 to a first receiver and time-frequency bins 101 to 600 to a second receiver, it should be able to effectively notify the receivers of the resource allocation.

Yet, it is very inefficient to indicate the allocated subcarriers one by one, for example, by specifying the indexes of the individual subcarriers on the frequency axis and the indexes of OFDM symbols with the subcarriers on the time axis because this resource allocation notification requires too much control information. Hence, a resource allocation scheme is under discussion, that groups time-frequency resources into resource blocks and allocates resources to UEs on a resource block basis.

FIG. 2 illustrates allocation of successive time-frequency resources as resource blocks and FIG. 3 illustrates allocation of scattered time-frequency resources as resource blocks.

A resource block with subcarriers successive in time and contiguous in frequency is called a localized resource block, as illustrated in FIG. 2. A resource block with subcarriers successive in time but distributed in frequency is called a distributed resource block, as illustrated in FIG. 3. In the distributed resource allocation of FIG. 3, spaced subcarriers are allocated in the same time area. As a result, the block-based resource allocation illustrated in FIGS. 2 and 3 reduces uplink signaling overhead.

FIG. 4 illustrates transmission of resource assignment information to UEs to which a Base Station (BS) allocates a plurality of resource blocks.

To notify a particular UE by allocation of a resource block, the BS basically uses the Identifier (ID) of the UE and resource block information. The UE ID is about 10 bits long and the resource block information occupies about 5 to 10 bits to deliver more accurate information.

The conventional resource assignment information signaling method increases signaling overhead because UE IDs and resource block information are indicated one by one, as explained above.

To avert this problem, only the UE IDs can be indicated in relation to resource blocks allocated to the UEs with the UE Ids, without explicitly signaling the resource block information.

Referring to FIG. 4, reference numeral 314 denotes resources available to the BS and reference numerals 307 to 313 denote logical resource blocks allocated to UEs. The resource allocation can be performed in a localized manner or a distributed manner, as illustrated in FIG. 2 or FIG. 3. Reference numeral 304 denotes the UE IDs of the UEs and reference numeral 306 denotes short IDs that identify the UEs to which resource blocks are allocated.

The BS first sends the UE IDs to the UEs to which radio resources are allocated in a certain order such that new IDs are allocated to the UEs in accordance with the transmission sequence numbers of the UE IDs. As the new IDs are mapped to the allocated resource blocks in a one-to-one correspondence, the UEs can find out which resource blocks are allocated to them. Therefore, signaling overhead is decreased, compared to the conventional signaling of information about allocated resource blocks together with the full UE IDs to the UEs.

In the illustrated case of FIG. 4, new IDs 01, 10 and 11 are allocated respectively to first, second and third UEs (301, 302 and 303) (UE 1, UE 2 and UE 3 respectively). If a resource block is not allocated to any UE, 00 is mapped to the resource block. Hereinafter, the new IDs are called as short IDs.

The BS allocates the resource blocks to UE 1, UE 2 and UE 3. A resource block 307 is allocated to UE 2 and thus 10 is signaled in respect to the resource block 307. Since the following resource block 308 is not allocated to any UE, 00 representing none is signaled in respect to the resource block 308. A resource block 309 is allocated to UE 1 and thus 01 is signaled in respect to the resource block 309. A resource block 310 is not allocated to any UE, 00 is signaled in respect to the resource block 310. A resource block 311 is allocated to UE 3 and thus 11 is signaled in respect to the resource block 311. For a resource block 313 allocated to UE 2, 10 is signaled.

Therefore, the BS signals the UEs' short IDs for the respective resource blocks, as denoted by reference numeral 306. The signaling of the short IDs in the order of the UEs to which the resource blocks are allocated obviates the need for additional information for mapping between the resource blocks and the UEs because the UEs are aware that a first resource block is allocated to the UE with a first short ID and the other resources blocks are allocated in this manner.

For the above-described resource assignment information signaling, a control channel is configured as described in Table 1 below.

TABLE 1

| Field | Bits |
|---|---|
| Num of scheduled UEs | 5 |
| {Num of scheduled UEs occurrences | |
| UE ID | 10 |
| } | |
| {number of resource block | |
| Short ID | $\lceil \log_2 (\text{NumofscheduledUEs} + 1) \rceil$ |
| } | |

In Table 1, Num of scheduled UEs indicates the number of UEs to which resources are allocated by the control channel. UE IDs for as many of these fields are included. UE ID identifies a UE to which resources are allocated. As many Short IDs as the allocated resource blocks are signaled. Since the UEs to which the resources are allocated are numbered with the Short IDs, the Short IDs may vary depending on UEs to which resources are allocated by the control channel.

For instance, if three UEs are allocated resources by the control channel, they are represented by 2-bit short IDs. For five UEs to which resources are allocated, 3-bit short IDs are feasible. Notably, more short IDs than the number of the UEs to which resources are allocated are required in order to notify non-allocated resource blocks. If the notification is not made, the number of short IDs can be equal to that of the UEs to which resources are allocated.

While the conventional signaling method reduces signaling overhead in that there is no need for signaling both UE IDs and resource block information, if the sequence of short IDs are not mapped to allocated resource blocks in a one-to-one correspondence, the receivers cannot determine a resource allocation sequence automatically. Moreover, the none ID (00 in FIG. 4) should be included in the short ID sequence to indicate a non-allocated resource block.

Meanwhile, signaling of dedicated resource assignment information that is kept valid for a predetermined time to UEs is under active discussion for services such as Voice over Internet Protocol (VoIP). In this case, there is no need for sending resource block information to the UEs at each time because in uplink transmission, a scheduler and a transmitter reside in different nodes.

Synchronous Hybrid Automatic Repeat reQuest (HARQ) uses the same resources and the same Adaptive Modulation and Coding (AMC) level for a retransmission as in an initial transmission. In this case, there is also no need for sending resource assignment information on a control channel. Since no IDs are sent even when the resource assignment information is not required, the conventional control channel transmission method is inefficient.

When control information is delivered to UEs on a plurality of Shared Control Channels (SCCHs), the conventional one-to-one mapping between short IDs and resource blocks is notified by each of the SCCHs, thereby causing signaling overhead. Accordingly, there exists a need for efficiently signaling resource assignment information, i.e. control information.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a method for efficiently signaling resource assignment information in order to notify of allocated resource blocks in an FDMA communication system.

Moreover, an aspect of exemplary embodiments of the present invention provides a method for signaling resource assignment information with minimal signaling overhead in an FDMA communication system.

In accordance with an aspect of the exemplary embodiments of the present invention, there is provided a method for signaling resource assignment information in an FDMA system, in which a bitmap is configured which indicates for each of a plurality of subcarriers each having a time-frequency area whether resource assignment information representing subcarrier allocation addresses the each subcarrier, temporary IDs are generated for UEs in correspondence with subcarriers addressed by the resource assignment information, and the bitmap and the temporary IDs are sent on a control channel.

In accordance with another aspect of the exemplary embodiments of the present invention, there is provided a method of a BS for signaling resource assignment information to a plurality of UEs on a control channel in an FDMA system, in which the BS allocates predetermined resource blocks to a plurality of UEs by scheduling, each resource block being formed with at least one time-frequency area, signals UE IDs of the UEs to which the resource blocks are allocated to the UEs, allocates short IDs to the UEs according to the order of signaling the UE IDs, maps the short ID of each of the UEs to a resource block allocated to the each UE, generates resource assignment information about the allocated resource blocks using the short IDs, generates a bitmap having as many bits as the number of total resource blocks available to the BS, the bitmap indicating whether the resource assignment information addresses each of the total resource blocks, and sends the UE IDs, the resource assignment information, and the bitmap on a control channel.

In accordance with a further aspect of the exemplary embodiments of the present invention, there is provided a method of a UE for receiving resource assignment information in an FDMA system, in which the UE receives a fundamental shared control channel from a BS, determines whether a UE ID of the UE is included in a UE ID list on the fundamental shared control channel, checks the position of the UE ID in the UE ID list, if the UE ID is included in the UE ID list, generates a temporary ID based on the position of the UE ID, compares the temporary ID with short IDs mapped to resource blocks addressed by resource assignment information included in the fundamental shared control channel, referring to a bitmap information, included in the fundamental shared control channel, indicating whether resource blocks are addressed by the resource assignment information, and determines, if there is any resource block with a short ID identical to the temporal ID, that the resource block is allocated to the UE.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF PREFERRED EMBODIMENTS

Figure 1:
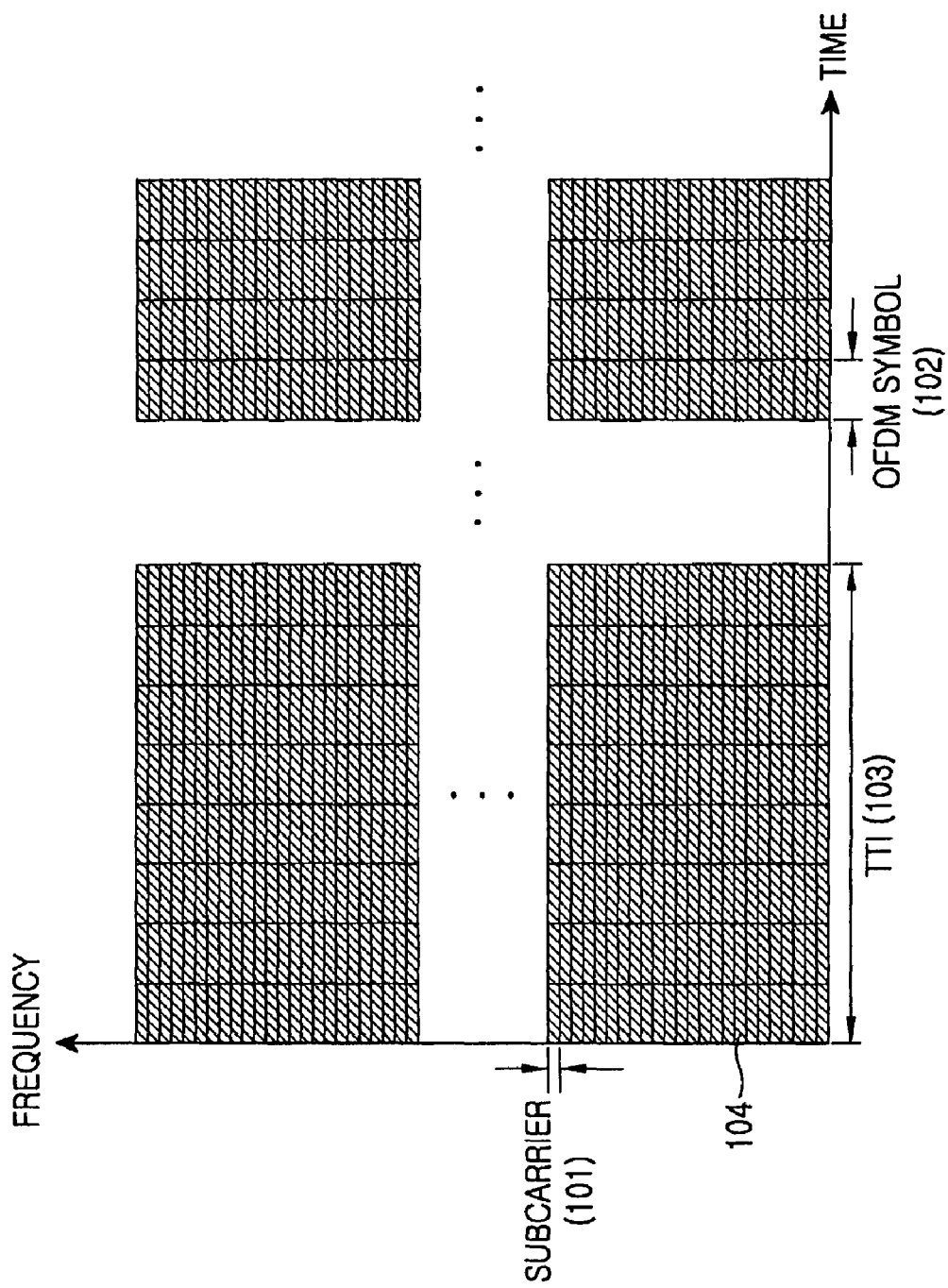
FIG. 1 illustrates time-frequency resource areas in an FDMA system.
Figure 2:
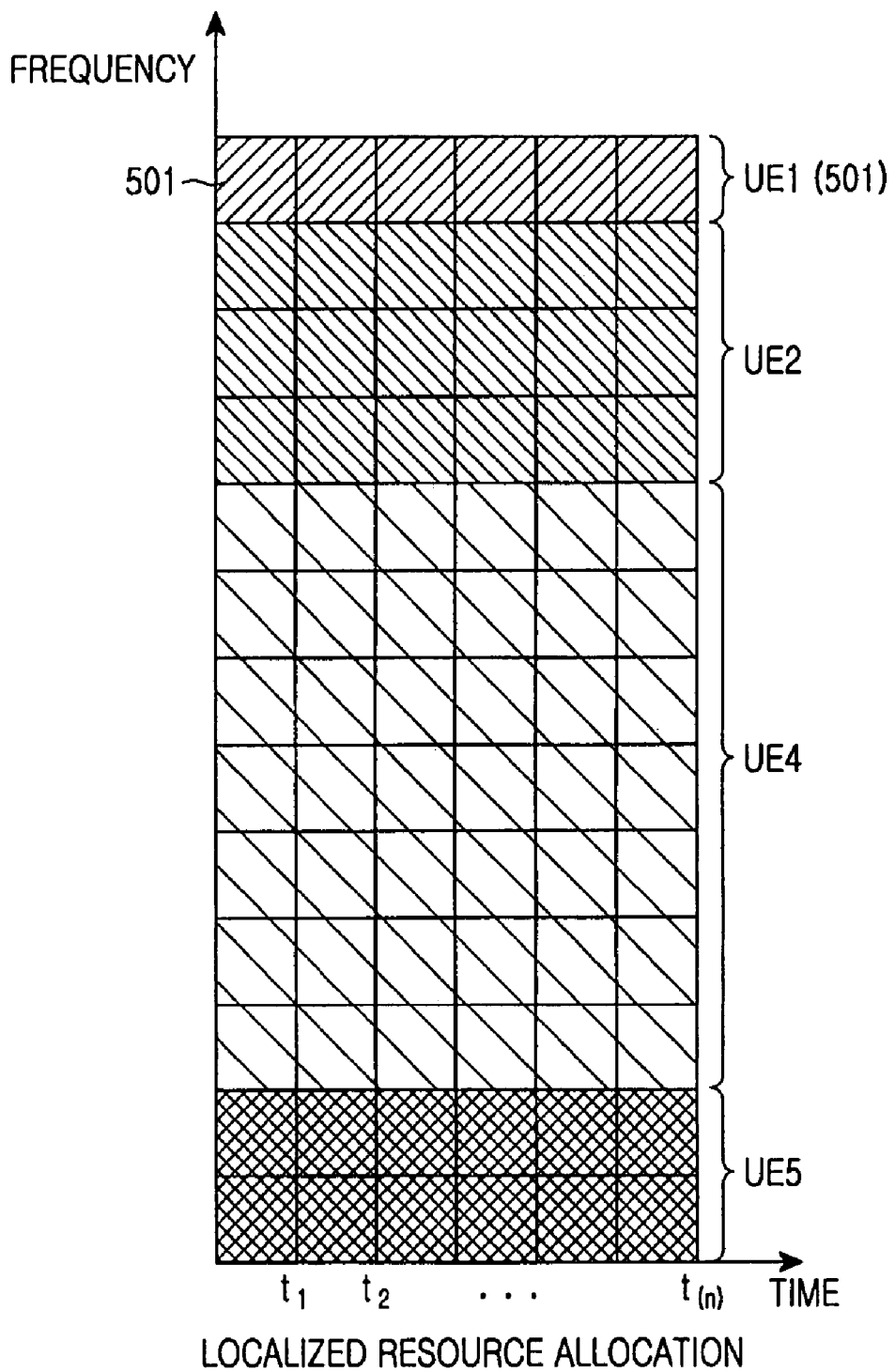
FIGS. 2 and 3 illustrate methods for blocking time-frequency resources in the FDMA system.
Figure 3:
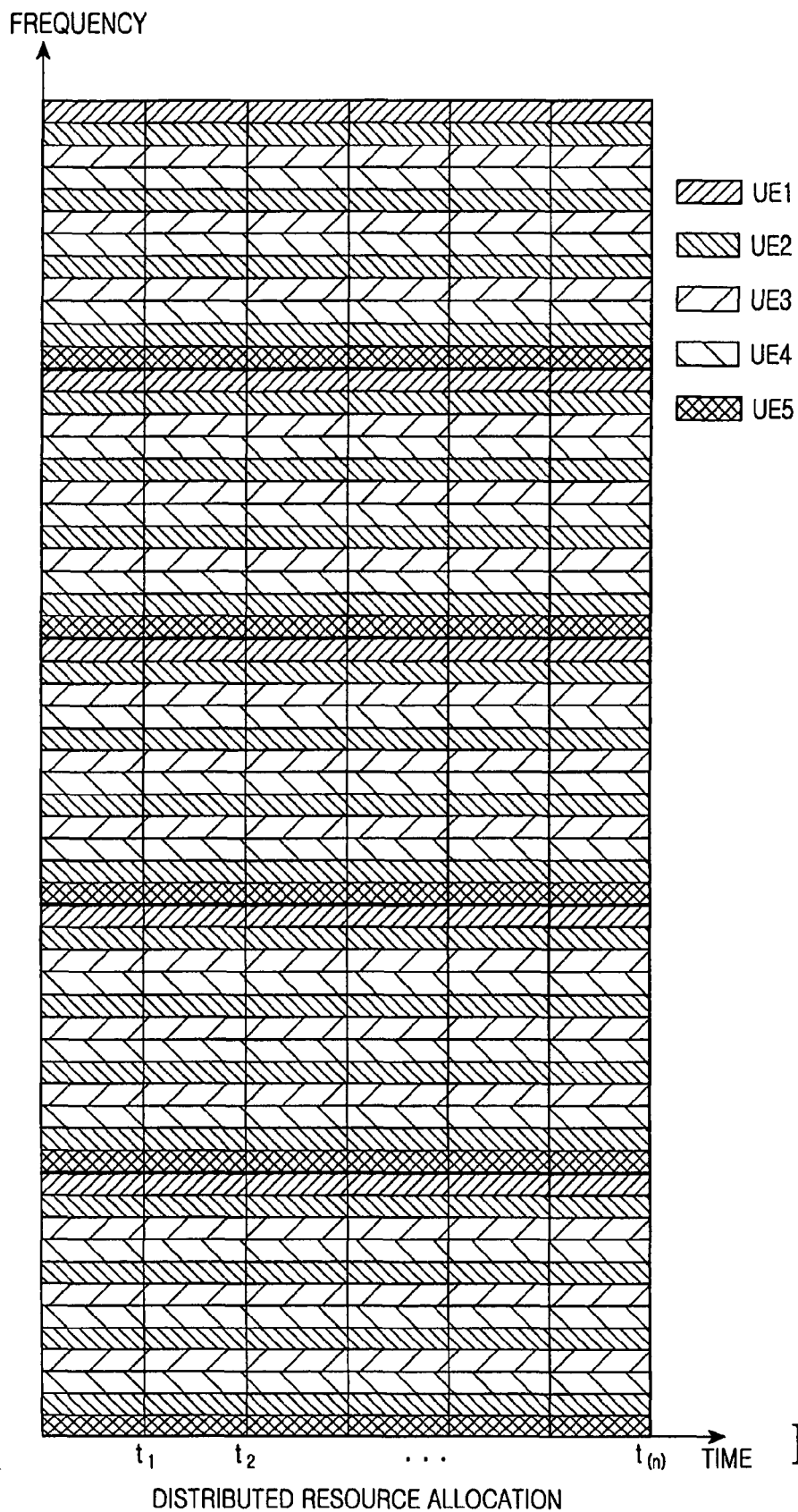
Figure 4:
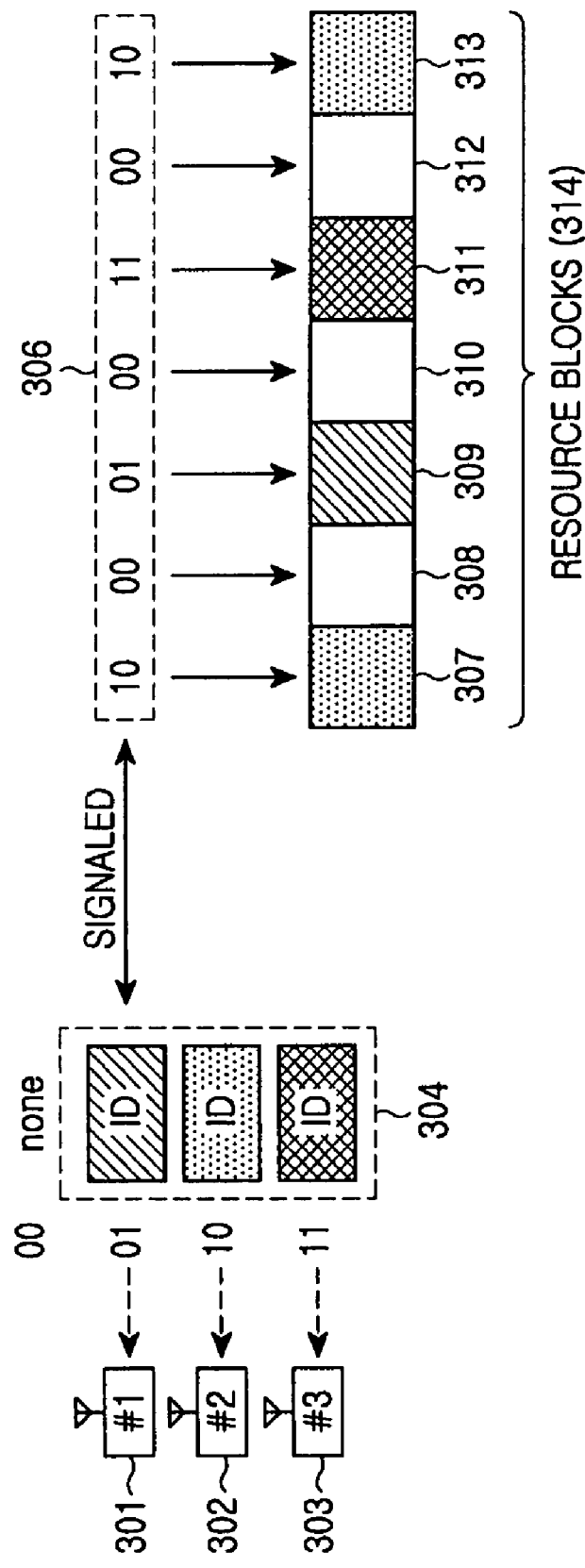
FIG. 4 illustrates a conventional resource block allocation method.

The following in the description provides a detailed construction and elements to assist in a comprehensive understanding of exemplary embodiments of the invention. In the drawings, the same drawing reference numerals will be understood to refer to the same elements, features and structures. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method for signaling UE IDs in the order of allocated resource blocks such that UEs can be aware of the mapping relationship between the UE IDs and the allocated resource blocks without additional resource block information. Particularly, the exemplary embodiments of the present invention provide a method for informing UEs of the mapping relationship between allocated resource blocks and UE IDs without signaling redundant resource assignment information, taking into account already occupied resource blocks at a resource allocation time.

The exemplary embodiments of the present invention also provide a method of a UE for receiving a bitmap indicating the positions of allocated resource blocks and then receiving resource assignment information describing only allocation of resource blocks other than the allocated resource blocks, referring to the bitmap.

Further, the exemplary embodiments of the present invention provide a method for, when sending a plurality of SCCHs, signaling UE IDs on an SCCH in correspondence with resource blocks other than resource blocks allocated by other SCCHs. In other words, when sending a plurality of SCCHs, for each of the SCCHs, the BS checks resource blocks allocated by the other SCCHs and signals short IDs of UEs in correspondence with resource blocks other than previously allocated resource blocks, thereby reducing signaling overhead. For this purpose, the exemplary embodiments of the present invention provide a method of a UE for, when a previous SCCH delivers resource assignment information about some resource blocks, receiving resource allocation assignment information about other resource blocks on a following SCCH.

Embodiment 1

An exemplary embodiment of the present invention provides a method for signaling UE IDs in the order of allocated resource blocks such that UEs can be aware of the mapping relationship between the allocated resource blocks and UEs to which the resource blocks are allocated. Also, the exemplary embodiment of the present invention provides a method for informing the UEs of already occupied resource blocks or enabling the UEs to determine the already occupied resource blocks and signaling to the UEs resource assignment information describing only allocated resource blocks other than the occupied resource blocks. Consequently, signaling overhead is reduced.

The BS allocates one or more resource blocks to each of UEs according to the status of the channel or buffer occupancy of the UEs and signals resource assignment information about the allocated resource blocks to the UEs on a control channel at each transmission time. A plurality of control channels may deliver the resource assignment information. Also, the UEs may be grouped according to their various channel status so that the resource assignment information can be carried on a single control channel. The control channel can be efficiently sent by control of its power and modulation/coding scheme.

For a plurality of control channels, at least one of the SCCHs is controlled appropriately in power and modulation/coding rate such that it can deliver common control information to all UEs within a cell. For reference herein, this SCCH is called a primary SCCH (SCCH1).

Another SCCH is configured to be sent to part of the cell or the entire cell and its power and modulation/coding rate are adjusted to levels suitable for reception at UEs within the part of the cell or the entire cell. This SCCH is called a secondary SCCH (SCCH2). SCCH1 can be designated as a fundamental control channel for sending control information to all UEs in the cell and SCCH2 can be designated as a supplemental control channel for sending control information to all UEs or some UEs.

This exemplary embodiment of the present invention provides a method for signaling information about the positions of resource blocks via SCCH1, for which resource assignment information delivered on SCCH1 is not valid at a transmission time of SCCH1.

Figure 5:
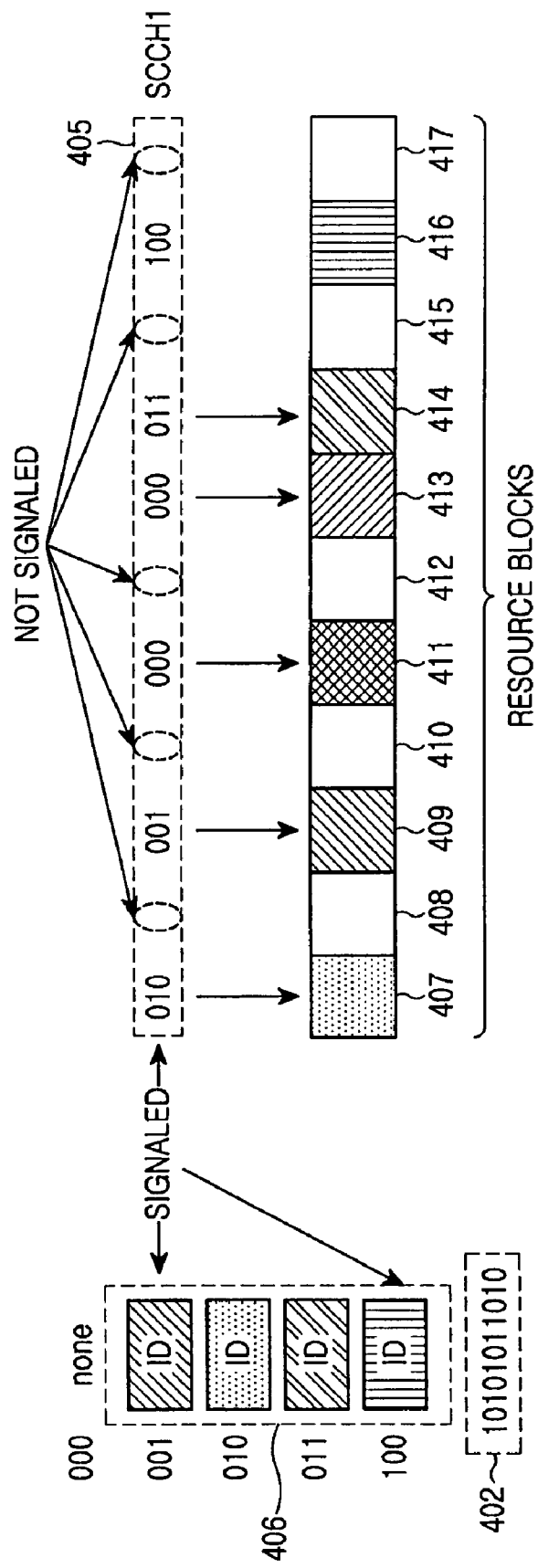
FIG. 5 illustrates a method for configuring resource assignment information on a fundamental control channel according to an exemplary embodiment of the present invention.

FIG. 5 illustrates a method for configuring resource assignment information to be sent on the fundamental control channel according to an exemplary embodiment of the present invention. Referring to FIG. 5, it is assumed that resource blocks 408, 410, 412, 415, 416, and 417 have already been occupied due to persistent scheduling or for synchronous HARQ, thus requiring no resource assignment information about them. In synchronous HARQ, a retransmission of an HARQ packet occurs a predetermined time after a previous transmission. Therefore, explicit signaling of resource assignment information is not required for retransmission, but the retransmission time is always fixed.

Thus, the positions of the resource blocks 408, 410, 412, 415, 416 and 417 that resource assignment information does not need to address, i.e. for which the resource assignment information is not valid are indicated to UEs in the form of a bitmap 402. Each bit of the bitmap indicates whether or not the resource assignment information indicates a resource block mapped to the bit. If the bit is '1', this means that the resource block is allocated, and if the bit is '0', this implies that the resource block is not allocated.

Accordingly, the bitmap 402 with 10101011010 indicates that the resource assignment information indicates allocation of $1^{st}$, $3^{rd}$, $5^{th}$, $7^{th}$, $8^{th}$, and $10^{th}$ resource blocks for a current TTI without addressing the other resource blocks, i.e., $2^{nd}$, $4^{th}$, $6^{th}$, $9^{th}$ and $11^{th}$ resource blocks.

In accordance with the exemplary embodiment of the present invention, the UEs are informed of resource blocks that the resource assignment information does not address by the bitmap 402 and short IDs mapped to only the allocated resource blocks in the resource assignment information. The number of the short IDs is equal to that of the valid resource blocks (i.e. the allocated resource blocks), not equal to that of the total resource blocks. Therefore, the overall signaling overhead of the system is reduced.

Referring to FIG. 5, the $1^{st}$ resource block is allocated to a UE with short ID=010 and the $3^{rd}$ resource block to a UE with short ID=001. The $5^{th}$ and $7^{th}$ resource blocks are mapped to short ID=000, which implies that resource assignment information about the $5^{th}$ and $7^{th}$ resource blocks is signaled on an SCCH other than SCCH1. The $8^{th}$ resource block is allocated to a UE with short ID=011 and the $10^{th}$ resource block is allocated to a UE with short ID=100. Hence, the resource assignment information eventually includes the UE IDs 406 of the UEs to which the resources are allocated, the bitmap 402, and the short IDs 405.

Embodiment 2

Another exemplary embodiment of the present invention provides a method for signaling resource assignment information on SCCH2 other than SCCH1 sent to the entire cell.

In accordance with the second exemplary embodiment of the present invention, resource assignment information sent on SCCH2 does not carry all short IDs mapped to all allocated resource blocks. UEs listening to SCCH2 have knowledge, from SCCH1, of resource blocks which were not allocated and thus not addressed by resource assignment information sent on SCCH1, or resource blocks that were allocated by the resource assignment information on SCCH1. Hence, the resource assignment information on SCCH2 only has to carry the short IDs of UEs to which resource blocks other than the above resource blocks are allocated, thereby using a reduced number of bits.

Figure 6:
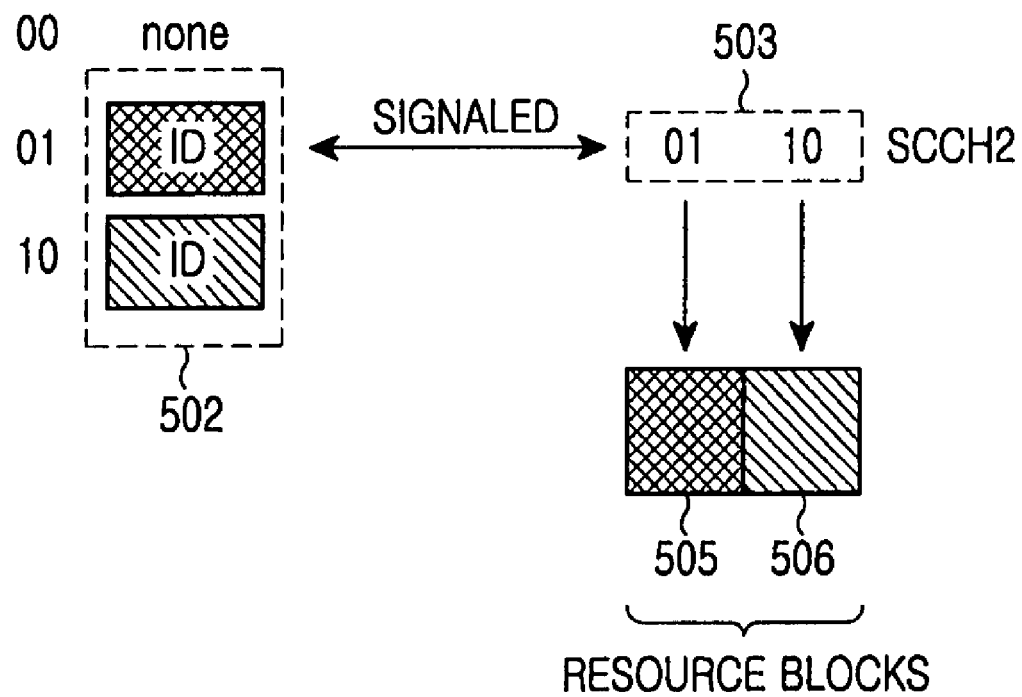
FIG. 6 illustrates a method for configuring resource assignment information on a supplemental control channel according to an exemplary embodiment of the present invention.

FIG. 6 illustrates a method for configuring resource assignment information to be sent on the supplemental control channel according to an exemplary embodiment of the present invention. Referring to FIG. 6, SCCH2 has basically the same configuration as that of SCCH1 except for the bitmap provided in SCCH1 because resource blocks that resource assignment information will not address for a current TTI on SCCH2 are known from SCCH1. Based on the resource assignment information earlier received on SCCH1, the resource assignment information on SCCH2 only has to indicate the allocation of the $5^{th}$ and $7^{th}$ resource blocks 411 and 413 mapped to short ID=none (000) in FIG. 5. These resource blocks are denoted by reference numerals 505 and 506 in FIG. 6.

Thus, the resource assignment information on SCCH2 includes UE IDs 502 of UEs to which the resource blocks 505 and 506 are allocated, and short IDs of the UEs mapped to the resource blocks 505 and 506.

If another control channel SCCH3 exists in addition to SCCH2, the UE interprets information fields of SCCH3 and uses resource assignment information delivered on SCCH3 after detecting already allocated resource blocks or non-allocated resource blocks from the resource assignment information on SCCH1 and SCCH2.

To render the above operation viable, the power and modulation/coding rate of each SCCH should be controlled so that UEs capable of receiving SCCH3 can receive SCCH1 and SCCH2 as well.

Table 2 below illustrates an exemplary configuration of SCCH1 to implement the resource assignment information signaling method of the present invention.

TABLE 2

| Field | Bits |
|---|---|
| Num of scheduled UEs | 5 |
| {Num of scheduled UEs occurrences | |
| UE ID | 10 |
| } | |
| {number of resource block BITMAP B1 . . . Bnumber resource block | |
| {number of 1 in BITMAP | |
| Short ID | $\lceil \log_2 (\text{NumofscheduledUEs} + 1) \rceil$ |
| } | |

In Table 2, SCCH1 further includes a bitmap and signals as many short IDs as the number of 1s in the bitmap. The number of bits in the bitmap is equal to that of total resource blocks in order to indicate whether the resource assignment information addresses the individual resource blocks.

Table 3 below illustrates an exemplary configuration of SCCH2 to implement the resource assignment information signaling method of the present invention.

TABLE 3

| Field | Bits |
|---|---|
| Num of scheduled UEs | 5 |
| {Num of scheduled UEs occurrences | |
| UE ID | 10 |
| } | |
| {number of non-scheduled resource block in SCCH1 | |
| Short ID | $\lceil \log_2 (\text{NumofscheduledUEs} + 1) \rceil$ |
| } | |

Referring to Table 3, SCCH2 differs from SCCH1 in that the former does not have a bitmap and short ID information is about only resource blocks with short ID=none (000) among resource blocks that the resource assignment information indicates on SCCH1, as indicated by the bitmap of SCCH1. Accordingly, the resource assignment information on SCCH2 contains fewer short IDs, i.e. as many short IDs as the number of non-scheduled resource blocks in SCCH1 among the resource blocks for which the resource assignment information of SCCH1 is valid.

Figure 7:
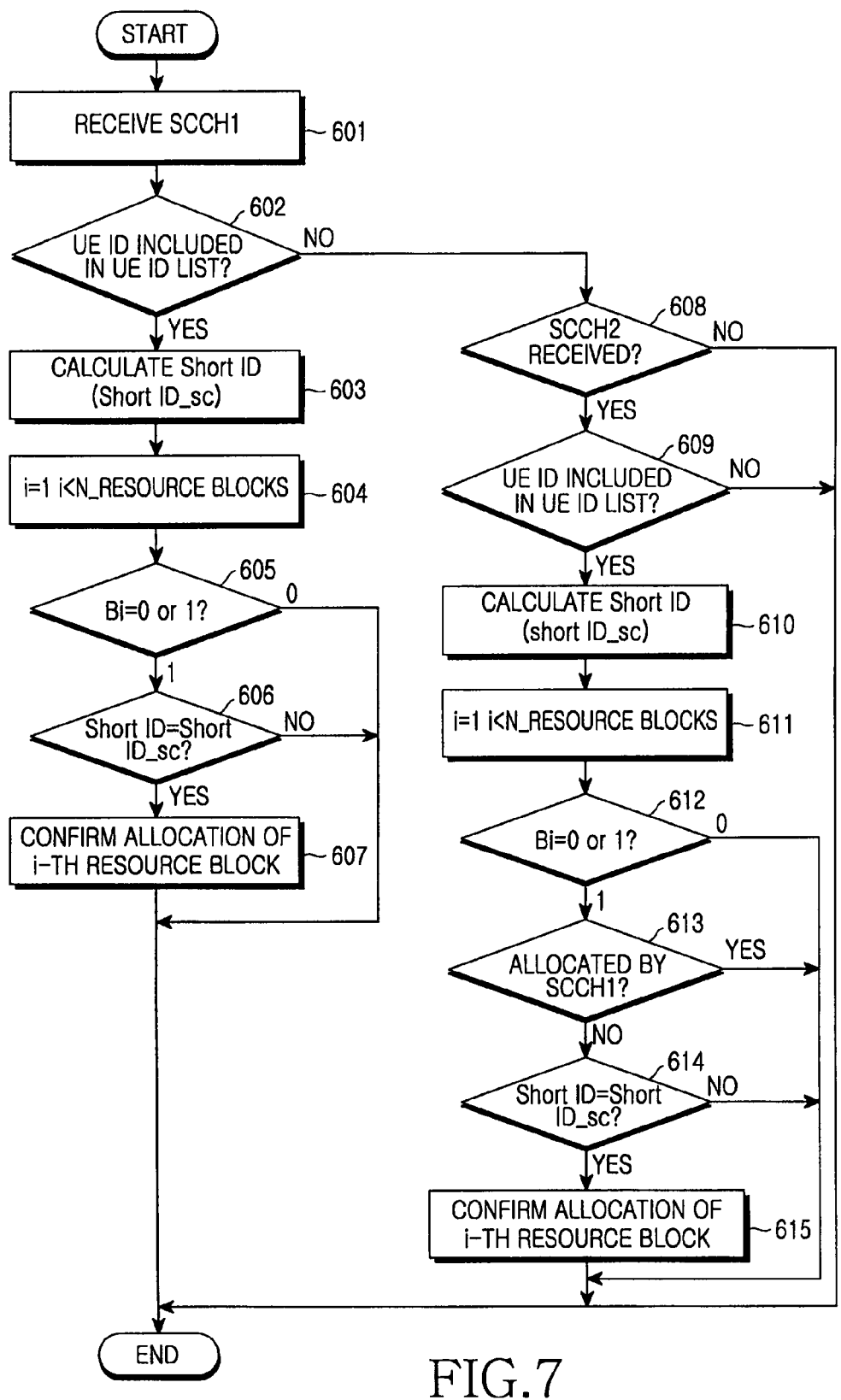
FIG. 7 is a flowchart illustrating a method for receiving a control channel in a UE according to an exemplary embodiment of the present invention.

FIG. 7 is a flowchart illustrating a method for receiving a control channel in a UE according to an exemplary embodiment of the present invention.

Referring to FIG. 1, the UE receives the fundamental control channel sent to the entire cell, SCCH1, in step 601 and determines whether its UE ID is included in a UE ID list on SCCH1 in step 602. In the presence of its UE ID, the UE generates its short ID (short ID_sc) based on the listing order of its UE ID in the UE list in order to determine resource blocks allocated to the UE in step 603.

In steps 604 through 607, given N resource blocks in total, the UE makes a decision over every resource block as to whether the resource block has been allocated to the UE. Specifically, the UE determines whether the bitmap information illustrated in Table 2 indicates whether the resource block is allocated to any UE.

If a bit corresponding to the resource block is determined to be 0 in step 605, which means that the resource block is already in use and thus resource assignment information on SCCH1 does not need to address the resource block, the UE is aware that there is no short ID mapped to the resource block and proceeds to receive a next SCCH. If the bit is determined to be 1 in the bitmap, which means that the resource assignment information indicates allocation of the resource block, the UE compares its short ID, sort ID_sc with a short ID mapped to the resource block in SCCH1 in step 606. If the short IDs are identical, the UE recognizes that the resource block has been allocated to the UE in step 607. When the bit check is completed over every resource block, the UE ends the algorithm.

On the other hand, if the UE ID list does not include the UE ID in step 602, the UE receives SCCH2 in step 608. SCCH2 is usually configured for reception at particular UEs. Hence, the UE determines whether to receive SCCH2 in step 608. If the UE cannot receive SCCH2, it ends the SCCH reception operation, considering that no resources have been allocated to the UE in this resource allocation. If any more SCCH exists in addition to SCCH1 and SCCH2, the UE may receive the additional SCCH.

If the UE receives SCCH2 in step 608, it determines whether a UE ID list of SCCH2 includes its UE ID in step 609. In the absence of the UE ID, the UE ends the SCCH reception operation. If another SCCH exists in addition to SCCH1 and SCCH2, the UE may receive the additional SCCH. On the other hand, in the presence of the UE ID, the UE calculates its short ID based on the listing order of the UE ID in the UE list in step 610. In steps 611 through 614, given M resource blocks in total, the UE makes a decision over every resource block as to whether there is any resource block allocated to the UE.

For this purpose, the UE determines for every resource block whether the resource assignment information of SCCH1 is valid or invalid for the resource block in step 612. If the resource assignment information is invalid for the resource block, i.e. a bit mapped to the resource block is 0 in the bitmap, the UE proceeds to the next resource block. On the other hand, if the bit is 1 in the bitmap, the UE determines whether the resource block was allocated to any other UE by SCCH1 by checking whether the short ID mapped to the resource block is none (000) or any other value.

If the resource block was determined to be allocated by SCCH1 in step 613, the UE proceeds to check a short ID mapped to the next resource block without checking the short ID mapped to the resource block because resource assignment information on SCCH2 does not describe the resource block allocated by SCCH1.

If SCCH1 did not allocate the resource block to any UE in step 613, the UE compares its short ID with a short ID mapped to the resource block in SCCH2 in step 614. If the short IDs are identical, the UE determines that the resource block has been allocated to the UE in step 615.

As is apparent from the above description, in accordance with the present invention, a BS does not send to UEs resource assignment information about resource blocks which are not allocated. The resulting decrease of signaling overhead increases the entire signaling efficiency of a mobile communication system and enables efficient utilization of radio resources.

While the invention has been shown and described with reference to certain exemplary embodiments of the present invention thereof, it will be understood by those skilled in the art that various changes in form and details may be made therein without departing from the spirit and scope of the present invention, as defined by the appended claims and their equivalents.

What is claimed is:

1. A method for signaling resource assignment information in a Frequency Division Multiple Access (FDMA) system, the method comprising:

configuring a bitmap indicating, for each of a plurality of resource blocks included in a resource block group allocated to a group of User Equipments (UEs), each of the plurality of resource blocks having a time-frequency area, whether each of the plurality of resource blocks is allocable to the group of UEs;

generating a sequence of short Identifiers (IDs) uniquely identifying UEs in the group, such that each of the short IDs in the sequence corresponds to a respective allocable resource block addressed by the bitmap; and sending the bitmap and the short IDs on a control channel.

2. The method of claim 1, wherein the number of the short IDs is equal to a number of resource blocks allocable to UEs in the bitmap.

3. The method of claim 1, wherein the size of the short IDs is determined according to a number of the allocable UEs.

4. The method of claim 1, wherein the control channel is a shared control channel to be sent commonly to UEs within a cell.

5. The method of claim 1, further comprising sending IDs of the allocable UEs wherein the short IDs are determined according to an order of the UE IDs.

6. A method for signaling resource assignment to a plurality of User Equipment (UE) on a control channel in a Frequency Division Multiple Access (FDMA) system, the method comprising:

allocating predetermined resource blocks to a plurality of UEs by scheduling, each resource block being formed with at least one time-frequency area;

signaling UE Identifiers (UE IDs) of the UEs to which the resource blocks are allocable to the UEs;

allocating short IDs to the UEs according to the order of signaling the UE IDs;

mapping the short ID of each of the UEs to a resource block allocable to each UE and generating resource assignment information about the allocable resource blocks using the short IDs;

generating a bitmap having as many bits as the number of total resource blocks available to the BS, the bitmap indicating whether the resource assignment information addresses each of the total resource blocks; and sending the UE IDs, the resource assignment information and the bitmap on a control channel.

7. The method of claim 6, wherein the control channel is a fundamental shared control channel.

8. The method of claim 7, further comprising:

allocating to predetermined UEs resource blocks other than the resource blocks allocated by the resource assignment information sent on the fundamental shared control channel among resource blocks that the resource assignment information sent on the fundamental shared control channel addresses, indicated by the bitmap, signaling UE IDs of the predetermined UEs to the predetermined UEs, and allocating new short IDs to the predetermined UEs in the order of signaling the UE IDs;

mapping the short ID of each of the predetermined UEs to a resource block allocable to each UE and generating resource assignment information about the allocable resource blocks using the short IDs; and sending the UE IDs and the resource assignment information on a supplemental shared control channel.

9. The method of claim 8, wherein the resource assignment information sent on the fundamental shared control channel includes a predetermined ID for a resource block other than the resource blocks allocated by the resource assignment information, the predetermined ID indicating that resource assignment information about the resource block is sent on the supplemental shared control channel.

10. The method of claim 7, wherein the bitmap is a bit sequence sequentially indicating positions of the resource blocks allocable to the plurality of UEs and the predetermined UEs and the positions of resource blocks allocable to no UEs.

11. The method of claim 10, wherein each bit of the bitmap is set to 1, if a resource block mapped to the bit among the total resource blocks is allocated to any UE, and to 0, if the resource block is not allocated to any UE at a time of resource block allocation to the plurality of UEs and the predetermined UEs.

12. The method of claim 6, wherein the number of the short IDs is equal to a number of resource blocks allocable to the UEs.

13. The method of claim 6, wherein the size of the short IDs is determined according to a number of the allocable UEs.

14. A method for User Equipment (UE) receiving resource assignment information in a Frequency Division Multiple Access (FDMA) system, the method comprising:

receiving a fundamental shared control channel from a Base Station (BS);

determining whether a UE ID of the UE is included in a UE ID list on the fundamental shared control channel;

checking a position of the UE ID in the UE ID list, if the UE ID is included in the UE ID list;

generating a temporary ID based on the position of the UE ID;

comparing the temporary ID with short IDs mapped to resource blocks addressed by resource assignment information included in the fundamental shared control channel, referring to a bitmap information included in the fundamental shared control channel indicating whether resource blocks are addressed by the resource assignment information; and determining, if there is resource block with a short ID identical to the temporal ID, that the resource block is allocated to the UE.

15. The method of claim 14, further comprising receiving a supplemental shared control channel including resource assignment information about resources other than resources allocated by the resource assignment information sent on the fundamental shared control channel, if the UE ID is not included in the UE ID list.

16. The method of claim 15, further comprising:

generating a new temporary ID based on the position of the UE ID in a UE ID list included in the supplemental shared control channel;

determining, if the bitmap indicates that a resource block is addressed by the resource assignment information included in the fundamental shared control channel, whether the resource block was allocated by the resource assignment information included in the fundamental shared control channel;

comparing the new temporary ID with a short ID mapped to the resource block in resource assignment information included in the supplemental shared control channel, if the resource block was not allocated by the resource assignment information included in the fundamental shared control channel; and determining, if the short ID is identical to the new temporal ID, that the resource block is allocated to the UE.

17. A method for User Equipment (UE) receiving resource assignment information in a Frequency Division Multiple Access (FDMA) system, the method comprising:

receiving a bitmap and a sequence of short IDentifiers (IDs) for uniquely identifying UEs on a control channel;

determining at least one allocated resource block using the bitmap and the sequence of short IDs, wherein the bitmap indicates, for each of a plurality of resource blocks included in a resource block group allocated to a group of UEs, each of the plurality of resource blocks having a time-frequency area, whether each of the plurality of resource blocks is allocable to the group of UEs and the sequence of short IDs indicates which respective UE of the UE group is allocated to each allocable resource block addressed by the bitmap.

18. The method of claim 17, wherein the length of the sequence of short IDs is equal to a number of resource blocks allocated to UEs in the bitmap.

19. The method of claim 17, wherein the size of the short IDs is determined according to a number of the allocated UEs.

20. The method of claim 17, wherein the control channel is a shared control channel to be sent commonly to UEs within a cell.

21. The method of claim 17, further comprising receiving a sequence of IDs of the allocated UEs wherein the short IDs are determined according to an order of the UE IDs.

22. An apparatus for receiving resource assignment information in a Frequency Division Multiple Access (FDMA) system, the apparatus comprising:

a receiver for receiving a bitmap and a sequence of short IDentifiers (IDs) uniquely identifying User Equipments (UEs) on a control channel;

a controller for determining at least one allocated resource block using the bitmap and the sequence of short IDs, wherein the bitmap indicates, for each of a plurality of resource blocks included in a resource block group allocated to a group of UEs, each of the plurality resource blocks having a time-frequency area, whether each of the plurality of resource blocks is allocable to the group of UEs, and the sequence of short IDs indicates which respective UE of the UE group is allocated to each allocable resource block addressed by the bitmap.

23. The apparatus of claim 22, wherein the length of the sequence of short IDs is equal to a number of resource blocks allocable to UEs in the bitmap.

24. The apparatus of claim 22, wherein the size of the short IDs is determined according to a number of the allocated UEs.

25. The apparatus of claim 22, wherein the control channel is a shared control channel to be sent commonly to UEs within a cell.

26. The apparatus of claim 22, wherein the receiver further receiving a sequence of IDs of the allocated UEs wherein the short IDs are determined according to an order of the UE IDs.

27. An apparatus for signaling resource assignment information in a Frequency Division Multiple Access (FDMA) system, the apparatus comprising:
- a controller for configuring a bitmap indicating, for each of a plurality of resource blocks included in a resource block group allocated to a group of User Equipments (UEs), each of the plurality of resource blocks having a time-frequency area, whether each of the plurality of resource blocks is allocable to the group of UEs and generating a sequence of short IDentifiers (IDs) uniquely identifying UEs in the group, such that the sequence indicates which respective UE of the UE group is allocated to each allocable resource block addressed by the bitmap; and
- a transmitter for sending the bitmap and the short IDs on a control channel.

28. The apparatus of claim 27, wherein the number of elements in the sequence of short IDs is equal to a number of resource blocks allocable to UEs in the bitmap.

29. The apparatus of claim 27, wherein the size of the short IDs is determined according to a number of the allocated UEs.

30. The apparatus of claim 27, wherein the control channel is a shared control channel to be sent commonly to UEs within a cell.

31. The apparatus of claim 27, further comprising sending IDs of the allocated UEs wherein the short IDs are determined according to an order of the UE IDs.

* * * * *